M. F. HILL.
ELECTRIC WELDING MACHINE.
APPLICATION FILED MAY 2, 1918.

1,330,468.

Patented Feb. 10, 1920.

Myron Francis Hill, Inventor

By his Attorneys
Williams & Pritchard

UNITED STATES PATENT OFFICE.

MYRON F. HILL, OF NEW YORK, N. Y.

ELECTRIC WELDING-MACHINE.

1,330,468. Specification of Letters Patent. Patented Feb. 10, 1920.

Application filed May 2, 1918. Serial No. 232,032.

*To all whom it may concern:*

Be it known that I, MYRON FRANCIS HILL, a citizen of the United States, residing at New York city, county and State of New York, have invented certain new and useful Improvements in Electric Welding-Machines, of which the following is a specification.

My invention relates to welding and particularly to welding unions to a plurality of parts to be welded together simultaneously.

These unions, preferably formed previous to the welding operation, are fitted to the joints, heated and caused to adhere to the parts to be joined together. They may be of any desirable length and applied apart or close together, or joined end to end by welding.

The current may be produced as usual and with transformers, one applied to each jaw if desired. When two jaws are used one may be of one polarity and the other the other polarity.

If three are used, one may be of one polarity and one of the opposite polarity.

If four jaws are used, one may be of one polarity and the others of the opposite polarity, but preferably either two adjacent or two diagonally opposite jaws are of one polarity and the others of the opposite polarity.

Any suitable combination of the jaws, levers and transformers may be employed, similar to systems well known in the art.

Figure 1:
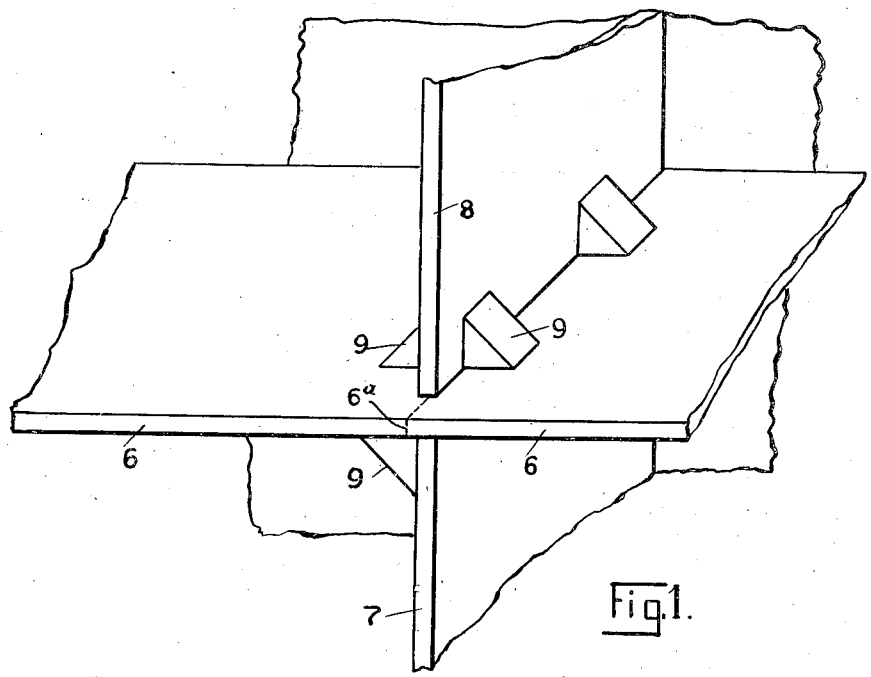
Figure 1 is a view of a welded joint.

In Fig. 1 are shown plates 6, divided sometimes at 6ª, and two plates 7 and 8, to to be joined together. Separate unions 9 are welded into the joints each adhering simultaneously to a plurality of plates, in this case two.

Figure 2:
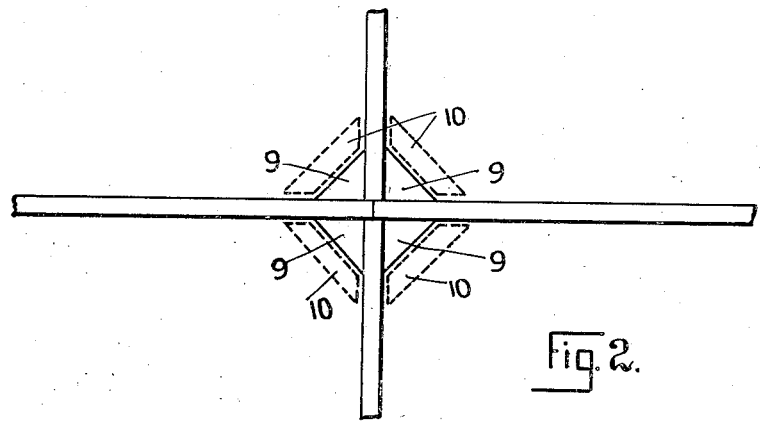
Fig. 2 is a plan view of the same.

In Fig. 2 are shown four such unions and the location of the welding jaw electrodes 10 when about to apply current and pressure. The jaws and unions may be so proportioned in size that the jaws converge upon the plates until stopped by them, this action pressing the heated unions so that they adhere to the plates, preferably all at once.

Figure 3:
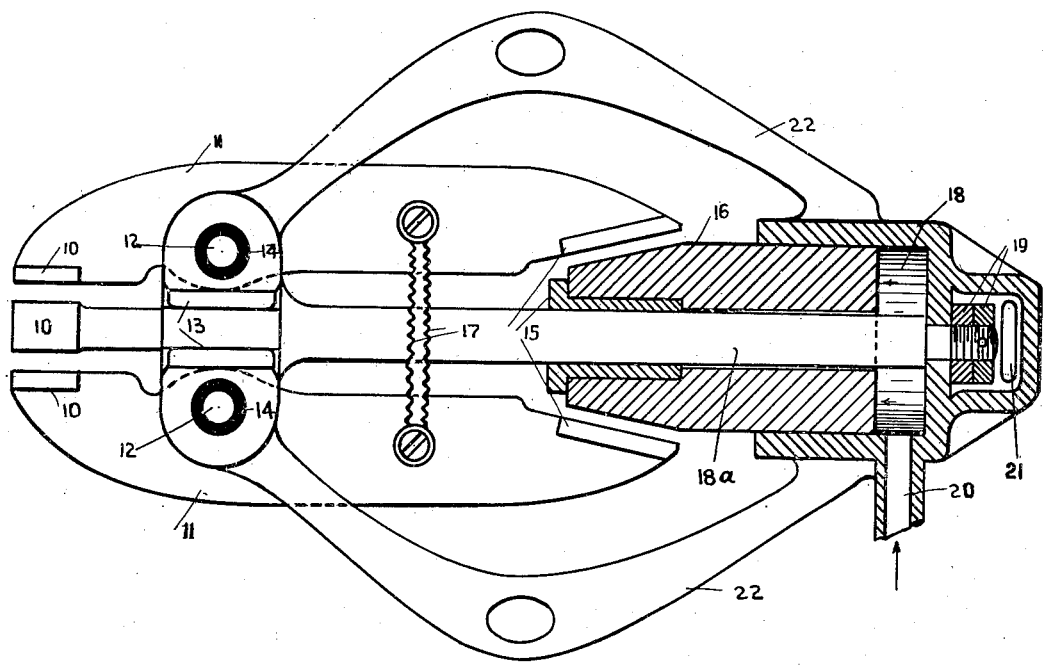
Fig. 3 is an elevation of the welding machine with one lever removed.

Fig. 3 shows the mechanical diagram of the welding machine, the transformer circuits in practice, being applied thereto in the usual way, two levers forming one circuit and two forming another circuit.

The jaws 10 are formed on levers 11 pivoted at 12 between lugs 13, and insulated at 14, with a generous surface capable of withstanding the necessary compression pressure.

The other ends of the levers have riding surfaces 15 adapted to be engaged by the cam 16 to apply pressure to the levers to close the jaws 10 toward each other. An electrical connection 17 may complete the circuit of two levers and the cam 16 may assist.

The cam forms part of a piston working in the cylinder 18 secured to the tension bar 18ª by nuts 19. The piston may be operated by air pressure to exert a hammer blow, or by hydraulic means to exert a slow but powerful pressure. The pipe 20 may be utilized to introduce the pressure to the cylinder chamber.

Suspension members 21 and 22 may be formed on the cylinder 17 and lugs 13, with which to handle the machine with a crane so that it may work in a horizontal or vertical position.

Figures 4, 5:
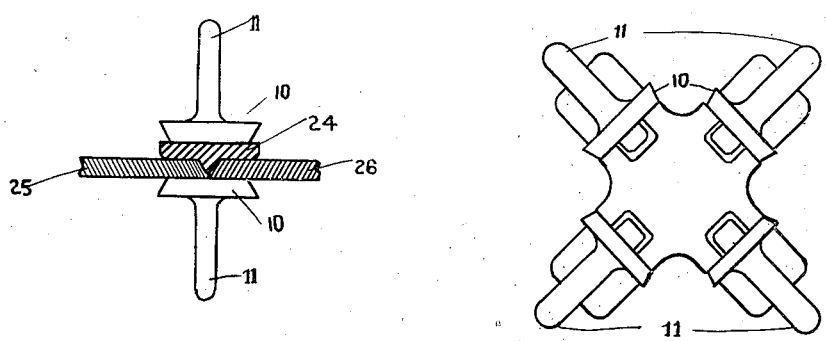
Fig. 4 is an end view of the welding machine.
Fig. 5 is a modification.

In Fig. 5 is shown how two opposite jaws of the machine may be utilized (the others removed) to form a seal by welding a strip to the edges of two plates simultaneously.

The strip 24 is pressed by the jaws 10 into the metal edges of the plates 25 and 26 uniting them by a powerful joint.

What I claim is:

1. A welding machine having pressure and electric welding jaw electrodes adapted to simultaneously weld separate metal unions to a plurality of parts to be joined together.

2. The combination claimed in claim 1 having four jaws adapted to form eight welds at once.

3. The combination claimed in claim 1 having said jaws adapted to form two welds with one jaw.

4. A weld between plates set at an angle comprising a triangular shaped union welded into said angle to both plates.

5. A welding machine having contact and pressure jaws to weld together plates arranged in two planes at angles to each other, and unions to weld said plates together adapted to receive the pressure of said jaws, said jaws arranged to press toward each other.

In testimony whereof I have affixed my signature to this specification.

MYRON F. HILL.